(12) United States Patent
Han et al.

(10) Patent No.: US 7,242,791 B2
(45) Date of Patent: Jul. 10, 2007

(54) METHOD AND SYSTEM FOR GUIDING A VEHICLE WITH VISION ENHANCEMENT

(75) Inventors: Shufeng Han, Johnston, IA (US); John Franklin Reid, Moline, IL (US); Terence Daniel Pickett, Waukee, IA (US)

(73) Assignee: Deere & Company, Moline, IL (US)

( * ) Notice: Subject to any disclaimer, the term of this patent is extended or adjusted under 35 U.S.C. 154(b) by 96 days.

(21) Appl. No.: 11/106,783

(22) Filed: Apr. 15, 2005

(65) Prior Publication Data

US 2006/0147088 A1 Jul. 6, 2006

Related U.S. Application Data

(60) Provisional application No. 60/641,240, filed on Jan. 4, 2005.

(51) Int. Cl.
*G06K 9/00* (2006.01)
*H04N 7/18* (2006.01)
*H04N 9/00* (2006.01)
*G01C 22/00* (2006.01)
*G01C 21/00* (2006.01)
*G05D 1/00* (2006.01)

(52) U.S. Cl. ................ 382/104; 382/103; 348/116; 348/120; 701/25; 701/28; 701/210; 701/213; 701/220

(58) Field of Classification Search .............. 382/104, 382/103; 348/113, 116, 118, 119, 120; 340/120, 340/935–942; 701/1, 23–28, 200, 207, 209–211, 701/213, 220
See application file for complete search history.

(56) References Cited

U.S. PATENT DOCUMENTS 4,868,871 A * 9/1989 Watson, III ................ 382/103

| 5,383,127 | A | * | 1/1995 | Shibata | 701/216 |
| 5,485,378 | A | * | 1/1996 | Franke et al. | 701/41 |
| 5,684,476 | A |   | 11/1997 | Anderson | 340/988 |
| 5,955,973 | A |   | 9/1999 | Anderson | 340/988 |
| 6,122,572 | A | * | 9/2000 | Yavnai | 701/23 |

(Continued)

OTHER PUBLICATIONS

Chatterji, G.B.; Menon, P.K.; and Sridhar, B. *GPS/Machine Vision Navigation System for Aircraft*. IEEE Transactions on Aerospace and Electronic Ssytems, vol. 33, No. 3 (Jul. 1997), pp. 1012-1025.

(Continued)

*Primary Examiner*—Andrew W. Johns
*Assistant Examiner*—Anthony Mackowey

(57) ABSTRACT

A method and system for guiding a-vehicle comprises a location module for collecting location data for the vehicle. A vision module collects vision data for the vehicle. A maximum allowable correction duration and a maximum allowable vision-derived displacement are established for correction of a position of a vehicle. A location quality estimator estimates location quality data for the corresponding collected location data during an evaluation time window. A vision module estimates vision quality data for the corresponding collected vision data during the evaluation time window. A selector selects the application of location data or vision data based on the quality data and at least one of the maximum allowable correction duration and the maximum allowable vision-derived displacement for the evaluation time window or for an application interval trailing the evaluation time window.

22 Claims, 4 Drawing Sheets

U.S. PATENT DOCUMENTS

| | | | |
|---|---|---|---|
| 6,385,515 | B1 | 5/2002 | Dickson et al. ............... 701/28 |
| 6,445,983 | B1 | 9/2002 | Dickson et al. ............... 701/23 |
| 6,597,985 | B2 * | 7/2003 | Toyooka .................... 701/207 |
| 6,597,987 | B1 * | 7/2003 | Barton ...................... 701/213 |
| 6,697,724 | B2 | 2/2004 | Beck ......................... 701/50 |
| 6,760,654 | B2 | 7/2004 | Beck ......................... 701/50 |
| 6,957,143 | B1 * | 10/2005 | Nadkarni .................... 701/207 |
| 2002/0105428 | A1 | 8/2002 | Benson et al. ............. 340/635 |
| 2002/0106108 | A1 | 8/2002 | Benson et al. ............. 382/104 |
| 2005/0015680 | A1 * | 1/2005 | Rubin et al. ................ 714/47 |

OTHER PUBLICATIONS

Guo, L.S.; Zhang, Q.; and Feng, L. *A Low-Cost Integrated Positioning System of GPS and Inertial Sensors for Autonomous Agricultural Vehicles*. ASAE Meeting Paper No. 033112 (Jul. 27-30, 2003).

Han, S.; Zhang, Q.; and Noh, H.K. *Applying Filtering Techniques to Improve GPS Positioning Accuracy*. ASAE Meeting Paper No. 01-1158 (Jul. 30-Aug. 1, 2001).

Noguchi, N.; Reid, J.F.; Will, J.; Benson, E.R.; and Stombaugh, T.S. *Vehicle Automation System Based on Multi-Sensor Integration*. ASAE Meeting Paper No. 983111 (1998).

You, S. and Neumann, U. *Fusion of Vision and Gyro Tracking for Robust Augmented Reality Registration*. In Proc. IEEE Virtual Reality, (2001) pp. 71-78.

Foessel-Bunting A, Bares J, and Whittaker W. Three-Dimensional Map Building With MMW Radar [online], [retrieved on Apr. 15, 2005]. Retrieved from the Internet:<URL:www.ri.cmu.edu/pubs/pub_3758.text.html>.

Welch G and Bishop G. Scaat: Incremental Tracking with Incomplete Information. International Conference on Computer Graphics and Interactive Techniques [online], Aug. 1997 [retrieved on Apr. 15, 2005]. Retrieved from the Internet: <URL:www.cs.unc.edu/~welch/publications.html>.

Roth S and Singh S. Application of Robust, High-Accuracy Positioning for Autonomous Ground Vehicles [online], Aug. 2004 [retrieved on Apr. 15, 2005]. Retrieved from the Internet:<URL:www.ri.cmu.edu/pubs/pub_4804_text.html>.

Wagner M, O'Hallaron D, Apostolopoulos D, and Urmson C. Principles of Computer System Design for Stereo Perception [online], Jan. 17, 2002 [retrieved on Apr. 15, 2005]. Retrieved from the Internet: <URL:frc.ri.cmu.edu/~mwagner/publications/18_980_final_report.pdf>.

* cited by examiner

METHOD AND SYSTEM FOR GUIDING A VEHICLE WITH VISION ENHANCEMENT

This document claims priority based on U.S. provisional application Ser. No. 60/641,240, filed Jan. 4, 2005, and entitled VISION-AIDED SYSTEM AND METHOD FOR GUIDING A VEHICLE, under 35 U.S.C. 119(e).

FIELD OF THE INVENTION

This invention relates to a vision-aided system and method for guiding a vehicle.

BACKGROUND OF THE INVENTION

Global Positioning System (GPS) receivers have been used for providing position data for vehicular guidance applications. However, although certain GPS receivers with differential correction may have a general positioning error of approximately 10 centimeters (4 inches) during a majority of their operational time, an absolute positioning error of more than 50 centimeter (20 inches) is typical for five percent of their operational time. Further, GPS signals may be blocked by buildings, trees or other obstructions, which can make GPS-only navigation system unreliable in certain locations or environments. Accordingly, there is a need for supplementing or enhancing a GPS-based navigation system with one or more additional sensors to increase accuracy and robustness.

SUMMARY OF THE INVENTION

A method and system for guiding a vehicle comprises a location module (e.g., location-determining receiver) for collecting location data for the vehicle. A maximum allowable correction duration and a maximum allowable vision-derived displacement are established for correction of a position of a vehicle. A vision module collects vision data for the vehicle. A location quality estimator estimates location quality data for the corresponding collected location data during an evaluation time window. A vision module estimates vision quality data for the corresponding collected vision data during the evaluation time window. A selector selects the application of location data or vision data based on the quality data and at least one of the maximum allowable correction duration and the maximum allowable vision-derived displacement for the evaluation time window or for an application interval trailing the evaluation time window.

DESCRIPTION OF THE PREFERRED EMBODIMENT

Figure 1:
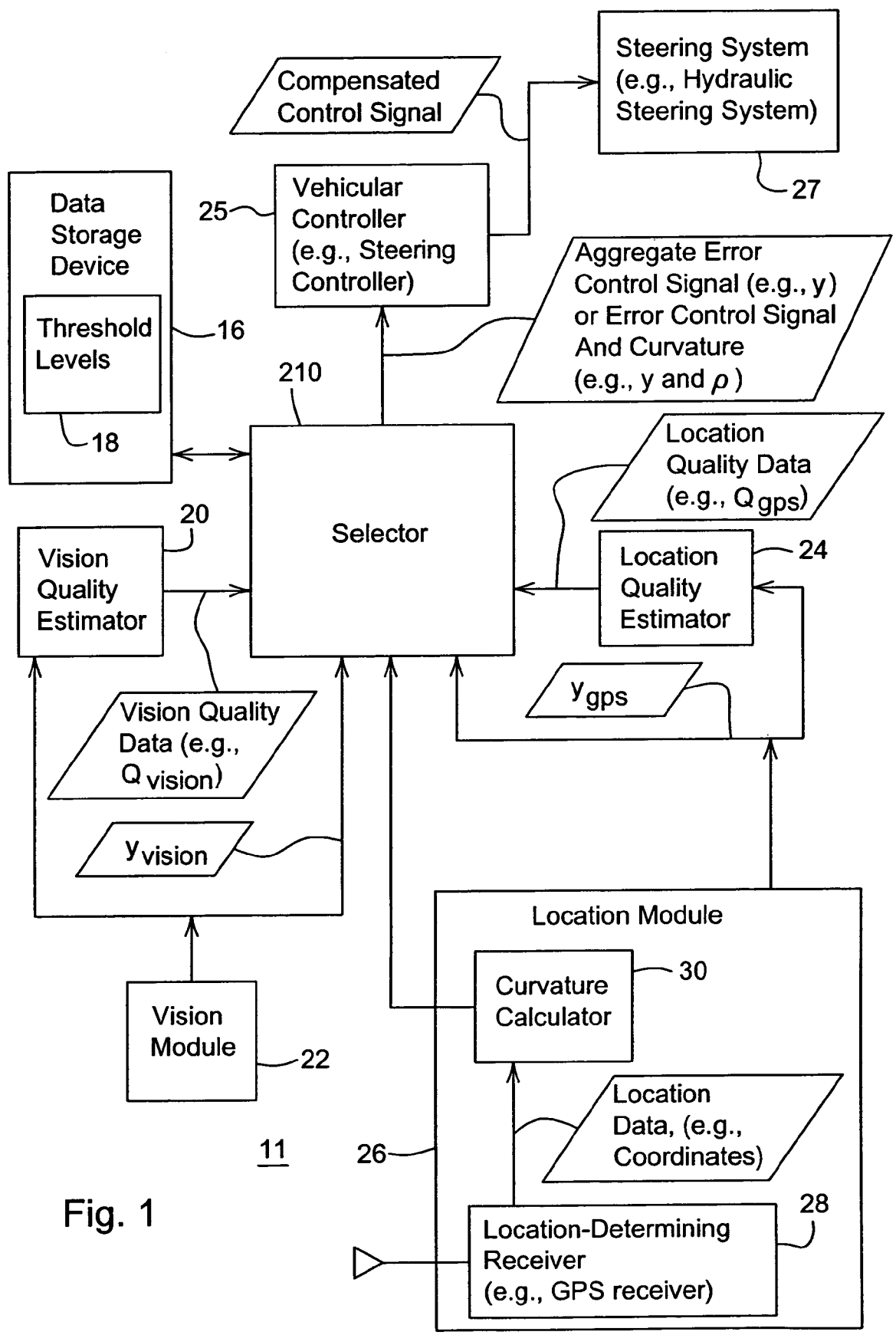
FIG. 1 is a block diagram of a system for guiding a vehicle based on location data and vision data in accordance with the invention.

FIG. 1 is a block diagram of a guidance system 11 for guiding a vehicle. The guidance system 11 may be mounted on or collocated with a vehicle or mobile robot. The guidance system 11 comprises a vision module 22 and a location module 26 that communicates with a selector 210.

The vision module 22 may be associated with a vision quality estimator 20. The location module 26 may be associated with a location quality estimator 24. The selector 210 may communicate with a data storage device 16, a vehicular controller 25, or both. In turn, the vehicular controller 25 is coupled to a steering system 27.

The location module 26 comprises a location-determining receiver 28 and a curvature calculator 30. The location-determining receiver 28 may comprise a Global Positioning System (GPS) receiver with differential correction. The location determining receiver provides location data (e.g., coordinates) of a vehicle. The curvature calculator 30 estimates the curvature or "sharpness" of a curved vehicle path or planned vehicle path. The curvature is the rate of change of the tangent angle to the vehicle path between any two reference points (e.g., adjacent points) along the path. The location module 26 may indicate one or more of the following conditions or status (e.g., via a status signal) to at least the selector 210 or the location quality estimator 24: (1) where the location module 26 is disabled, (2) where location data is not available or corrupt for one or more corresponding evaluation intervals, and (3) where the estimated accuracy or reliability of the location data falls below a minimum threshold for one or more evaluation intervals. The location module 26 or location-determining receiver 28 provides location data for a vehicle that is well-suited for global navigation or global path planning.

In one illustrative embodiment, the location module 26 outputs location data in the following format:

$$y_{gps} = \begin{bmatrix} E_{off\_gps} \\ E_{head\_gps} \end{bmatrix},$$

where the location data comprises $y_{gps}$ which is the location error signal associated with the location module 26, where $E_{off\_gps}$ is the off-track error estimated by the location module 26 (e.g., location-determining receiver 28), $E_{head\_gps}$ is the heading error estimated by the location module 26

In an alternative illustrative embodiment, the location module 26 outputs location data in the following format:

$$y_{gps} = \begin{bmatrix} E_{off\_gps} \\ E_{head\_gps} \\ \rho_{gps} \end{bmatrix},$$

where the location data comprises $y_{gps}$ which is the location error signal associated with the location module 26, where $E_{off\_gps}$ is the off-track error estimated by the location module 26 (e.g., location-determining receiver 28), $E_{head\_gps}$ is the heading error estimated by the location module 26, and $\rho_{gps}$ is the radius of curvature estimated by the location module 26. The curvature does not represent an error estimate and there is no curvature quality associated with the radius of curvature as used herein; rather, the curvature is a parameter that may be used for selection of an appropriate guidance mode or guidance rules, for example.

The vision module 22 may comprise an image collection system and an image processing system. The image collection system may comprise one or more of the following: (1) one or more monocular imaging systems for collecting a group of images (e.g., multiple images of the same scene with different focus settings or lens adjustments, or multiple images for different field of views (FOV)); (2) a stereo vision system (e.g., two digital imaging units separated by a known distance and orientation) for determining depth information or three-dimensional coordinates associated with points on an object in a scene; (3) a range finder (e.g., laser range finder) for determining range measurements or three-dimensional coordinates of points on an object in a scene; (4) a ladar system or laser radar system for detecting the speed, altitude direction or range of an object in a scene; (5) a scanning laser system (e.g., a laser measurement system that transmits a pulse of light and estimates distance between the laser measurement system and the object based on the time of propagation between transmission of the pulse and reception of its reflection) for determining a distance to an object in a scene; and (6) an imaging system for collecting images via an optical micro-electromechanical system (MEMS), free-space optical MEMS, or an integrated optical MEMS. Free-space optical MEMS use compound semiconductors and materials with a range or refractive indexes to manipulate visible light, infra-red, or ultraviolet light, whereas integrated optical MEMS use polysilicon components to reflect, diffract, modulate or manipulate visible light, infra-red, or ultraviolet light. MEMS may be structured as switching matrixes, lens, mirrors and diffraction gratings that can be fabricated in accordance with various semiconductor fabrication techniques. The images collected by the image processing system may be in color, monochrome, black-and-white, or grey-scale images, for example.

The vision module 22 may support the collection of position data (in two or three dimensional coordinates) corresponding to the location of features of an object within the image. The vision module 22 is well suited for using (a) features or local features of an environment around a vehicle, (b) position data or coordinates associated with such features, or both to facilitate navigation of the vehicle. The local features may comprise one or more of the following: plant row location, fence location, building location, field-edge location, boundary location, boulder location, rock locations (e.g., greater than a minimum threshold size or volume), soil ridge and furrows, tree location, crop edge location, cutting edge on other vegetation (e.g., turf), and a reference marker (e.g., an optically recognizable or distinguishable landmark). The position data of local features may be used to tune (e.g., correct for drift) the location from the location module 26 on a regular basis (e.g., periodically). The location correction duration measures the elapsed time from the last tuning or correction of the location data with vision data (e.g., with reference to reference markers or landmarks). The selector 210 or the guidance system 11 may set a maximum allowable correction duration (e.g., 30 seconds) as an limit or guideline as to the reliability or error (e.g., drift) of the location data.

In one example, the reference marker may be associated with high precision location coordinates. Further, other local features may be related to the reference marker position. The current vehicle position may be related to the reference marker location or the fixed location of local features. In one embodiment, the vision module 22 may express the vehicle location in coordinates or a data format that is similar to or substantially equivalent to the coordinates or data format of the location module 26. The vision module 22 may indicate one or more of the following via a status or data message to at least the supervisor or the vision quality estimator 20: (1) where the vision module 22 is disabled, (2) where vision data is not available during one or more evaluation intervals, (3) where the vision data is unstable or corrupt (for one or more evaluation intervals), and (4) where the image data is subject to an accuracy level, a performance level or a reliability level that does not meet a threshold performance/reliability level (for one or more evaluations intervals).

In one example, a vision module 22 is able to identify plant row location with an error as small as 1 centimeter for soybeans and 2.4 centimeter for corn.

In one illustrative example, the vision module 22 outputs vision data in the following format:

$$y_{vision} = \begin{bmatrix} E_{\text{off\_vision}} \\ E_{\text{head\_vision}} \end{bmatrix},$$

where $y_{vision}$ comprises vision data which is the vision error signal associated with the vision module 22, where $E_{\textit{off\_vision}}$ is the off track error estimated by the vision module 22 and $E_{\textit{head\_vision}}$ is the heading error estimated by the vision module 22.

In another illustrative example or alternate embodiment, the vision module 22 outputs vision data in the following format:

$$y_{vision} = \begin{bmatrix} E_{\text{off\_vision}} \\ E_{\text{head\_vision}} \\ \rho_{vision} \end{bmatrix},$$

where $E_{\textit{off\_vision}}$ is the off track error estimated by the vision module 22, $E_{\textit{head\_vision}}$ is the heading error estimated by the vision module 22, and $\rho_{vision}$ is the radius of curvature estimated by the vision module 22.

The location quality estimator 24 may comprise one or more of the following devices: a signal strength indicator associated with the location-determining receiver 28, a bit error rate indicator associated with the location-determining receiver 28, another device for measuring signal quality, an error rate, signal strength, or performance of signals, channels, or codes transmitted for location-determination. Further, for satellite-based location-determination, the location quality estimator 24 may comprise a device for determining whether a minimum number of satellite signals (e.g., signals from four or more satellites on the L1 band for GPS) of a sufficient signal quality are received by the location-determining receiver 28 to provide reliable location data for a vehicle during an evaluation interval.

The location quality estimator 24 estimates the quality of the location data or location quality data (e.g., $Q_{gps}$) outputted by the location module 26. The location quality estimator 24 may estimate the quality of the location data (e.g., location error signal) based on the signal strength indicator (or bit-error rate) of each signal component received by the location-determining receiver 28. The location quality estimator 24 may also base the quality estimate on any of the following factors: (1) the number of satellite signals that are available in an area, (2) the number of satellites that are acquired or received by the location-determining receiver with a sufficient signal quality (e.g., signal strength profile) and (3) whether each satellite signal has an acceptable signal level or an acceptable bit-error rate (BER) or frame-error rate (FER).

In one embodiment, different signal strength ranges are associated with different corresponding quality levels. For example, the lowest signal strength range is associated with the low quality, a medium signal strength range is associated with a fair quality, and highest signal strength range is associated with a highest quality. Conversely, the lowest bit-error rate range is associated with the highest quality, the medium bit error range is associated with the fair quality, and the highest bit error rate range is associated with the lowest quality level.

The vision quality estimator 20 estimates the quality of the vision data (e.g., vision error control signal) or vision quality data (e.g., $Q_{vision}$) outputted by the vision module 22. The vision quality estimator 20 may consider the illumination present during a series of time intervals in which the-vision module 22 operates and acquires corresponding images. The vision quality estimator 20 may include a photo-detector, a photo-detector with a frequency selective lens, a group of photo-detectors with corresponding frequency selective lenses, a charge-coupled device (CCD), a photometer, cadmium-sulfide cell, or the like. Further, the vision quality estimator 30 comprises a clock or timer for time-stamping image collection times and corresponding illumination measurements (e.g., luminance values for images). In one illustrative embodiment, if the illumination is within a low intensity range, the vision quality is low for the time interval; if the illumination is within a medium intensity range, the vision quality is high for the time interval; and if the illumination is within a high intensity range, the vision quality may be characterized as one or more of the following: fair, low and high. The foregoing intensity range versus quality may be applied on a light frequency by light frequency or light color basis, in one example. In another example, the intensity range versus quality may be applied for infra-red range frequencies and for ultraviolet range frequencies differently than for visible light.

The vision quality estimation may be related to a confidence measure in processing the images. If the desired features (e.g., plant rows) are apparent in one or more images, the vision quality estimator 20 may assign a high image quality or high confidence level for the corresponding images. Conversely, if the desired features are not apparent in one or more images (e.g., due to missing crop rows), the vision quality estimator 20 may assign a low image quality or a low confidence level. In one example, the confidence level is determined based on a sum of the absolute-differences (SAD) of the mean intensity of each column vector (e.g., velocity vector for the vision module 22) for the hypothesized yaw/pitch pair. Yaw may be defined as the orientation of the vision module 22 in an x-y plane and pitch may be defined as the orientation of the vision module 22 in an x-z plane, which is generally perpendicular to the x-y plane.

If the vision module 22 is unable to locate or reference a reference feature or reference marker in an image or has not referenced a reference marker in an image for a threshold maximum time, the vision module 22 may alert the vision quality estimator 20, which may degrade the quality of the vision data by a quality degradation indicator.

In general, the selector 210 comprises a data processor, a microcontroller, a microprocessor, a digital signal processor, an embedded processor or any other programmable (e.g., field programmable) device programmed with software instructions. In one embodiment, the selector 210 comprises a rule manager that may apply one or more threshold levels 18, data decision functions, relationships, or if-then statements to facilitate the assignment of a vision quality threshold to vision results derived from the vision data and a location quality threshold (e.g., GPS quality threshold) to the location results derived from the location data for a corresponding time interval. The vision quality threshold may determine the extent that the contribution of the vision data (e.g., $y_{vision}$) from the vision module 22 governs. The location quality threshold may determine the extent that the contribution of location data from the location module 22 governs. The selector 210 determines the relative contributions of location data (e.g., $y_{gps}$) and vision data (e.g., $y_{vision}$) to the aggregate error control signal (e.g., y) in the fusion guidance mode (i.e., a third guidance mode) or in other modes based on one or more of the following factors: vision quality threshold, the location quality threshold, the maximum allowable correction duration, and the maximum allowable vision displacement.

In one embodiment, the output of the selector 210 may comprise an aggregate error control signal (e.g., y):

$$y = \begin{bmatrix} E_{off} \\ E_{head} \end{bmatrix},$$

where y is the aggregate error signal, where the $E_{off}$ is the aggregate off-track error from the aggregation of error data from the vision module 22 and the location module 26, and $E_{head}$ is the aggregate heading error from the aggregation of the error data from the vision module 22.

In another embodiment, the output of the selector 210 may comprise an aggregate error control signal (e.g., y):

$$y = \begin{bmatrix} E_{off} \\ E_{head} \\ \rho \end{bmatrix},$$

where y is the aggregate error signal, where $E_{off}$ is the aggregate off-track error from the aggregation of error data from the vision module 22 and the location module 26, $E_{head}$ is the aggregate heading error from the aggregation of the error data from the vision module 22 and the location module 26 and $\rho$ is the radius of curvature. The aggregate error control signal represents a difference (or an error) between measured location data (measured by the vision module 22 and by location module 26) and the actual location of the vehicle. Such an aggregate error control signal is inputted to the vehicle controller 25 to derive a compensated control signal. The compensated control signal corrects the management and control of the steering system 27 based on the aggregate error control signal. The steering system 27 may comprise an electrical interface for communications with the vehicle controller 25. In one embodiment, the electrical interface comprises a solenoid-controlled hydraulic steering system or another electromechanical device for controlling hydraulic fluid.

In another embodiment, the steering system 27 comprises a steering system unit (SSU). The SSU may be associated with a heading versus time requirement to steer or direct the vehicle along a desired course or in conformance with a desired path plan. The heading is associated with a heading error (e.g., expressed as the difference between the actual heading angle and the desired heading angle).

The SSU may be controlled to compensate for errors in the estimated position of the vehicle by the vision module 22 or the location module 26. For example, an off-track error indicates or is representative of the actual position of the vehicle (e.g., in GPS coordinates) versus the desired position of the vehicle (e.g., in GPS coordinates). The off-track error may be used to modify the movement of the vehicle with a compensated heading. However, if there is no off-track error at any point in time or a time interval, an uncompensated heading may suffice. The heading error is a difference between actual vehicle heading and estimated vehicle heading by the vision module 22 and the location module 26. The curvature is the change of the heading on the desired path. The curvature data may be used by the SSU to control the vehicle to follow a desired curved path.

Figure 2:
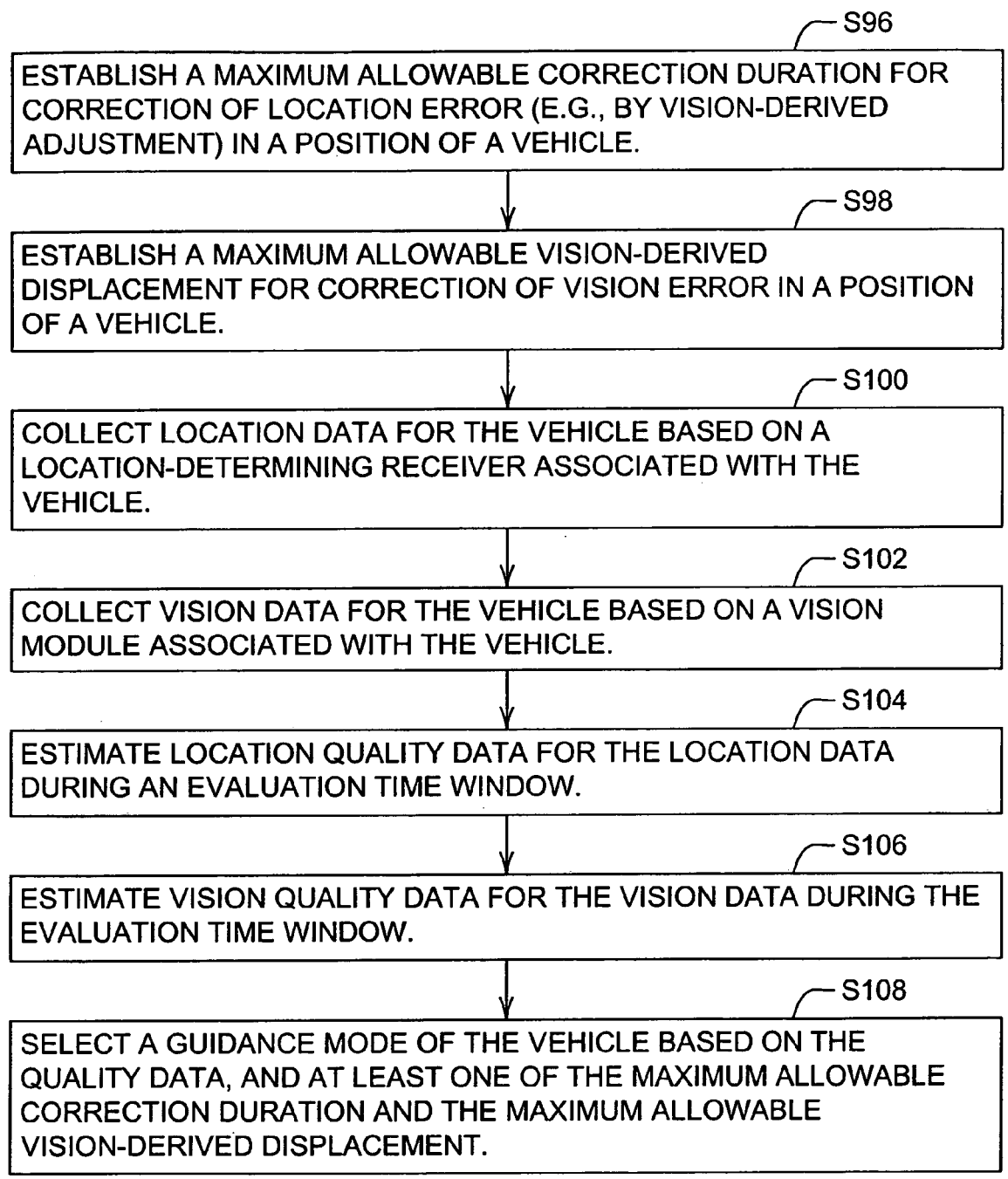
FIG. 2 is a flow chart of a method for guiding a vehicle based on location data and vision data in accordance with the invention.

FIG. 2 is a flow chart of a method for guiding a vehicle with a vision data and location data. The method of FIG. 2 begins in step S96.

In step S96, a maximum allowable correction duration is established for correction of a location error (e.g., offset) in a position of the vehicle. The maximum allowable correction duration is generally correlated to a maximum displacement error or error vector between an actual vehicle position and a desired vehicle position of vehicle. The maximum allowable correction duration provides a limit to over-reliance on certain location data, which has not been corrected or updated by a vision-derived correction in a timely or sufficiently recent manner. The maximum allowable correction duration may limit erroneous or corrupt location data from being applied to adjust the position of the vehicle.

In step S98, a maximum allowable vision-derived displacement is established for correction of a location error (e.g. offset) in a position of the vehicle. A maximum allowable vision-derived displacement defines a maximum displacement or vector between an actual vehicle position and a desired vehicle position of the vehicle. The maximum allowable vision-derived displacement provides a limit to the amount of correction that is applied based on the vision data. The maximum allowable vision-derived displacement may limit erroneous or corrupt correction data from being applied to adjust the position of the vehicle. In one illustrative example, the maximum allowable vision-derived displacement is consistent with a last known or last reliable vehicle position and the speed and heading of the vehicle. In another illustrative example, the maximum allowable vision-derived displacement is consistent with a last known vehicle position or last reliable vehicle position and a maximum speed of the vehicle along a generally linear trajectory or path between the last known vehicle position and the corrective vehicle position.

In step S100, a location module 26 or a location-determining receiver 28 determines location data for a vehicle associated therewith. For example, the location-determining receiver 28 (e.g., a GPS receiver with differential correction) may be used to determine coordinates of the vehicle for one or more evaluation time intervals or corresponding times. Further, in step S100, the location module 26 may determine or derive a location-error signal (e.g., $y_{gps}$), a location-derived curvature (e.g., $\rho_{gps}$), or both from the location data. The location-error signal may represent a (1) difference between the actual vehicular location and a desired vehicular location for a desired time, (2) a difference between the actual vehicular heading and a desired vehicular heading for a desired time or position, (3) or another expression of error associated with the location data. The location-error signal may be defined, but need not be defined, as vector data. The location-derived curvature may represent a difference between the actual curvature and a desired curvature for a given time or another expression of error associated with the curvature.

In step S102, a vision module 22 associated with the vehicle determines vision data for one or more of said evaluation time intervals or corresponding times. For example, the vision module 22 may collect images and process the collected images to determine vision data. In one example, the vision data comprises vision-derived position data of a vehicle, which is obtained by reference to one or more visual reference marker(s) or reference features with corresponding known locations to determine coordinates of a vehicle. The coordinates of a vehicle may be determined in accordance with a global coordinate system or a local coordinate system. Further, in step S102, the location module 26 may determine or derive a vision error signal (e.g., $y_{vision}$), a vision-derived curvature (e.g., $\rho_{vision}$), or both from the location data. The vision error signal represents (1) a difference between the actual vehicular location and a desired vehicular location for a desired time, (2) a difference between the actual vehicular heading and a desired vehicular heading for a desired time or position, (3) or another expression of error associated with the vision data. The vision-derived curvature may represent a difference between an actual curvature and a desired curvature for a given time or the expression of error associated with the curvature.

In step S104, a location quality estimator 24 estimates location quality data for the location data during an evaluation time window. Step S104 may be carried out by various techniques which may be applied alternately or cumulatively. Under a first technique, the location quality estimator 24 may estimate or measure signal quality, an error rate (e.g., bit error rate or frame error rate), a signal strength level (e.g., in dBm), or other quality levels. Under a second technique, the location quality estimator 24 first estimates or measures signal quality, an error rate (e.g., bit error rate or frame error rate), a signal strength level (e.g., in dBm), or other quality levels; second, the location quality estimator 24 classifies the signal quality data into ranges, linguistic descriptions, linguistic values, or otherwise.

In step S106, a vision quality estimator 20 estimates vision quality data during the evaluation time window. The vision quality estimator 20 may comprise a luminance or photo-detector and a time or clock for time-stamping luminance measurements to determine a quality level based on the ambient lighting conditions. The vision quality estimator 20 may also comprise a measure of confidence or reliability in processing the images to obtain desired features. The confidence or reliability in processing the images may depend upon any of the following factors, among others: technical specification (e.g., resolution) of the vision module 22, reliability of recognizing an object (e.g., landmark or visual reference marker in an image), reliability of estimating a location of the recognized object or a point thereon, reliability of converting image coordinates or local coordinates to a global coordinates or vision-derived location data that is spatially and temporally consistent with the location data from the location module 26.

In step S108, a selector 210 determines or selects a guidance mode based on the quality data (e.g., the location quality data and the vision quality data) and at least one of the maximum allowable correction duration and the maximum allowable vision derived displacement. The selection of the guidance mode may be carried by a location-error signal, a vision error signal, an error signal or an aggregate error signal which is transmitted from the selector 210 to the vehicular controller 25. The selection of a guidance mode may be carried out in accordance with various techniques that may be applied alternately or cumulatively.

Under a first technique for executing step S108, the selector 210 applies one or more threshold levels 18 with respect to measured location quality levels of the location data, estimated vision quality levels of the vision data, or both, to obtain a selected guidance mode. The selector 210 may establish a location quality threshold and compare measured location quality level of the location data to the location quality threshold for a given time interval. If the measured location quality level meets or exceeds the location quality threshold, the selector 210 may select a first mode that relies predominately upon location data, subject to a maximum allowable correction duration, a maximum allowable vision-derived displacement, or both. The selector 210 may establish a vision quality threshold and compare the estimated vision quality level of the vision data to the vision quality threshold for a given time interval. If the measured vision quality level meets or exceeds the location quality threshold, the selector 210 may select a second mode that relies predominately upon vision data, subject to a maximum allowable correction duration, a maximum allowable vision-derived displacement, or both.

Under a second technique for executing step S108, the selector 210 accesses a data storage device 16 (e.g., a look-up table, a database, a relational database, a tabular file) to access threshold levels for guidance modes. Further, the data storage device 16 may store input set data as location quality data, vision quality data, and threshold levels; for each permutation or unique arrangement of the input set data, the data storage device 16 may store a corresponding output set data as selected guidance modes. Each input set data is associated with a corresponding unique output set data, for example.

In one illustrative example, the location quality data and vision quality data are derived based on an evaluation time window; the mode selection may be applied during an application time window that lags the evaluation time window or that is substantially coextensive with the evaluation time interval. Regardless of how the evaluation time window and the application time window are defined in this example, in other examples the selector 210 may provide predictive control data, feed-forward control data, or feedback control data to the vehicle controller 25.

Figure 3:
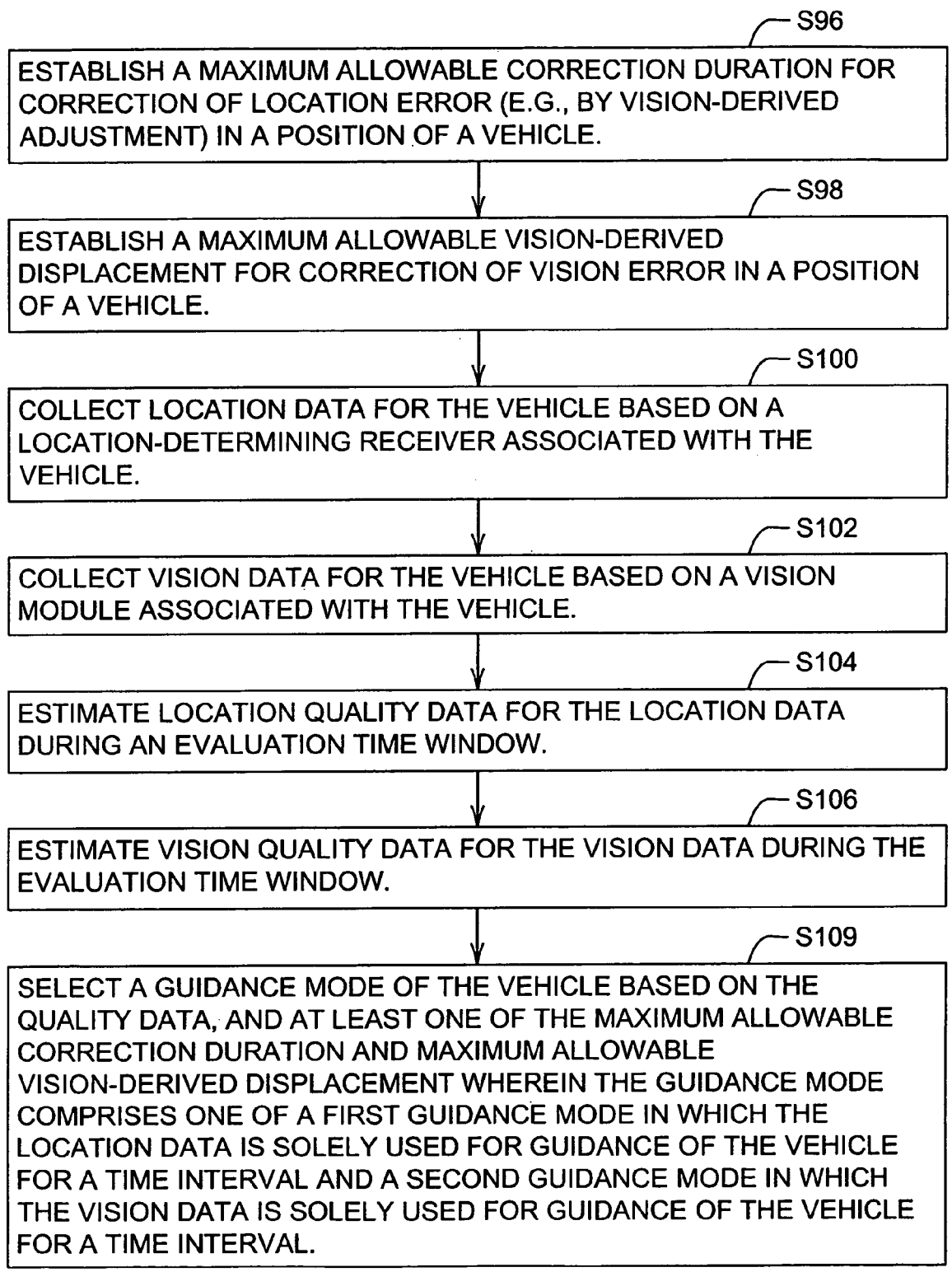
FIG. 3 is a flow chart of another method for guiding a vehicle based on location data and vision data in accordance with the invention.

The method of FIG. 3 is similar to the method of FIG. 2, except the method of FIG. 3 replaces step S108 with step S109. Like reference numbers indicate like steps or procedures in FIG. 2 and FIG. 3.

After step S106 in step S109, the selector 210 selects a guidance mode of the vehicle based on the quality data (e.g., location quality data, vision quality data, or both) and at least one of the maximum allowable correction duration and the maximum allowable vision displacement. In general, the guidance mode comprises a first guidance mode or second guidance mode. In the first guidance mode the location data is solely or predominately used for guidance of the vehicle for a time interval, whereas in a second guidance mode the vision data is solely or predominately used for guidance of the vehicle for a time interval.

In an alternate version of step S109, step S109 may allow a first guidance mode, a second guidance mode, and a third guidance mode or fusion guidance mode. The fusion guidance mode represents a combination of the first guidance mode and the second guidance mode for a time interval, where the location data and vision data may each contribute to the aggregate error signal.

Figure 4:
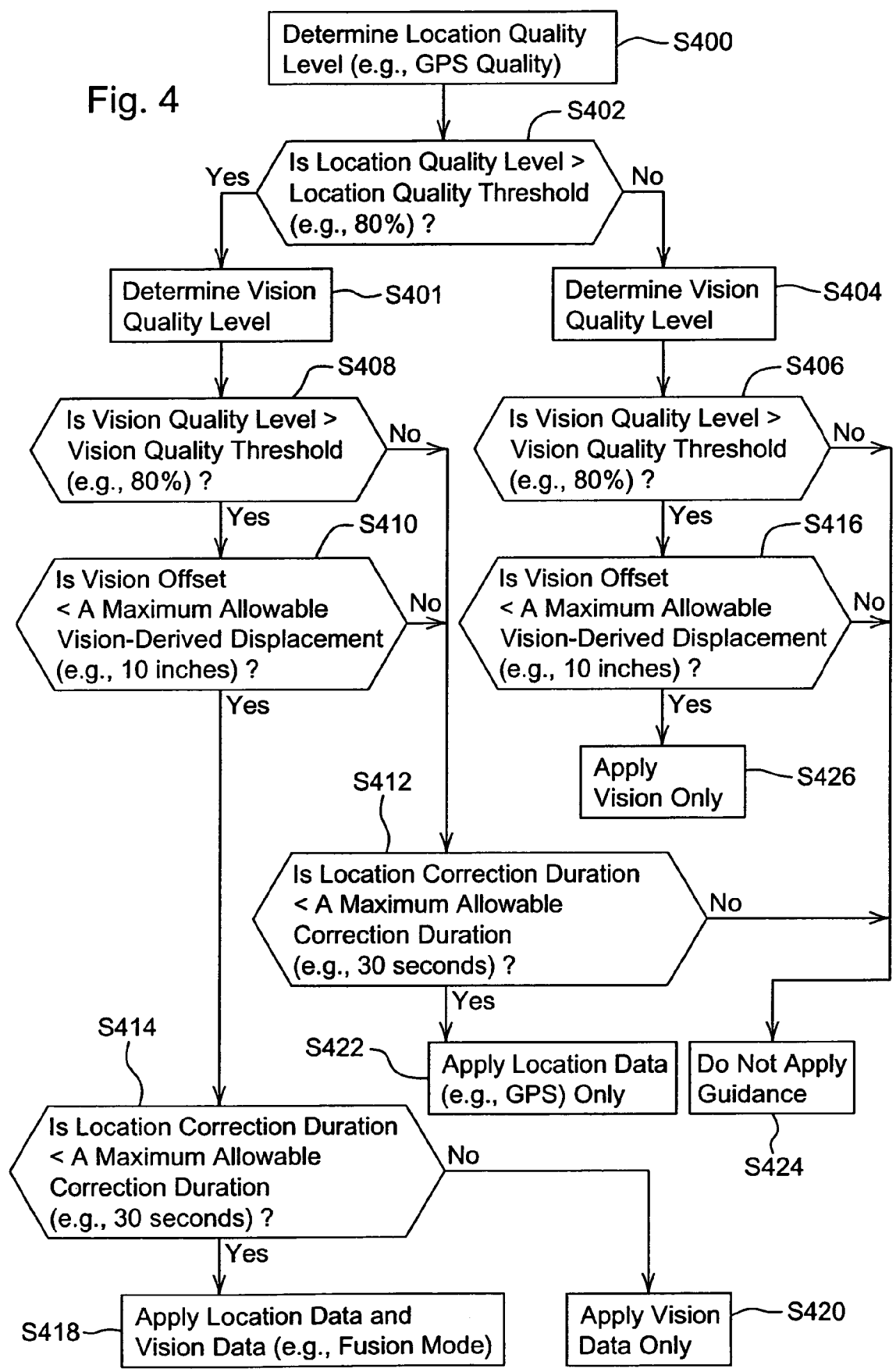
FIG. 4 is a flow chart that illustrates selection of a guidance mode for a guidance system comprising a vision module and a location-determining module.

FIG. 4 is a flow chart for a method for determining a mode of operation of a vehicular guidance system. The method facilitates determining whether a vehicle should be guided by location data only (e.g., GPS data only), vision data only, a combination of location data and vision data (e.g., fusion) or neither vision data nor location data. The method of FIG. 4 begins in step S400.

In step S400, a location quality estimator 24 estimates or determines the location quality level (e.g., GPS quality or Dilution of Precision (DOP)) for location data outputted by the location module 26 for a given time interval. Location quality data may be classified or categorized into location quality levels or defined in terms of location quality levels, for example. Dilution of Precision (DOP) is an indicator of the quality of a location data (e.g., GPS position data) which considers the relative locations of satellites and their geometric relationship to the location determining receiver. For example the DOP may consider the number of satellites that are available (e.g., capable of being received with a reliable signal strength, a signal quality level, a maximum bit or symbol error rate) to a location module 26 from particular geographic coordinates of the location module 26 at a given time.

In step S402, the selector 210 determines if the location quality level of the estimated location quality data is greater than (or equal to) a location quality threshold. The location quality threshold may be defined with reference to a particular reliability level, expressed as a percentage, a certain DOP value, or otherwise (e.g., 80% reliability or confidence level). If the determined location quality level is greater than (or equal to) the location quality threshold, the method continues with step S401. However, if the location quality level is not greater than the location quality threshold, the method continues with step S404.

In step S401 and in step S404, the vision quality estimator 20 estimates the vision quality data for vision data outputted by the vision module 22 for a defined time interval. Vision quality data may be classified or organized into vision quality levels or defined in terms of vision quality levels, for example. The defined interval may be generally coextensive with the given time interval used by the location quality estimator 24. Alternatively, the defined time interval may lag the time interval used by the location quality estimate 24 by a nominal amount.

In step S408, the selector 210 determines if the vision quality level of the vision quality data is greater than a vision quality threshold. The vision quality threshold may be defined with reference to a particular reliability level, expressed as a percentage or otherwise (e.g., 80% reliability or confidence level). If the vision quality level is greater than (or equal to) the vision quality threshold, the method continues with step S410. However, if the vision quality level is not greater than (or equal to) the threshold quality level, the method continues with step S412.

In step S410, the selector 210 determines if the vision offset is less than (or equal to) a maximum allowable vision-derived displacement (e.g., 10 inches). The maximum allowable vision-derived displacement may be set by a user data input, empirical studies, tests, or practical benchmarks based on environmental factors (e.g., crop selection, planting date, and date of guidance of vehicle). If the vision offset is less than (or equal to) the maximum allowable vision-derived displacement, the method continues with step S414. However, if the vision offset is not less than or equal to a maximum allowable vision-derived offset, the method continues with step S412.

In step S414, the selector 210 determines if the location correction duration (e.g., GPS correction) is less than a maximum allowable correction duration. The maximum allowable correction duration means a maximum elapsed time since last correction of the location data by reference to the vision data. For instance, the vision data may recognize a reference marker with known coordinates in a collected image to provide a known position (e.g., two or three dimensional coordinates) of the vehicle with respect to the reference marker; if the location data is inconsistent with the known position, the selector 210 or guidance system 11 may issue a correction (e.g., error signal) to the location data (e.g., applied by the selector 210) to align the location data and vision data estimates on the vehicle location. The location error (e.g., GPS drift) associated with the location data is generally time dependent. For example, the longer the time since the last correction of the location data by reference to the vision data, the greater the drift. The maximum allowable correction duration may be expressed in seconds or another measurement unit of time. If the location correction duration is less than (or equal to) a maximum allowable correction duration, then in step S418 the selector 210 or the vehicular controller 25 applies a combination of location data (e.g., GPS data) and vision data in a sensor fusion guidance mode for guidance of the vehicle during a trailing time interval associated with the given time interval or the defined time interval. A sensor fusion guidance mode refers to a mode that applies a combination of location data and vision data to guide the vehicle, where the relative contributions of location data and vision data to the aggregate error signal may remain fixed or may vary over time in accordance with a fusion algorithm. However, if the location correction duration is not less than a maximum allowable correction duration, then in step S420 the selector 210 or the vehicular controller 25 applies only vision data for guidance of the vehicle for a trailing time interval associated with the given time interval or the defined time interval.

Step S412 may follow step S408 or step S410, as previously described herein. In step S412, the selector 210 determines if the location correction duration is less than a maximum allowable correction duration. As previously described herein, the maximum allowable correction duration means a maximum elapsed time since last correction of the location data by reference to the vision data. The location error (e.g., GPS drift) associated with the location data is generally time dependent. For example, the longer the time since the last correction of the location data by reference to the vision data, the greater the drift. The maximum allowable correction duration may be expressed in seconds or another measurement unit of time. If the location correction duration is less than (or equal to) a maximum allowable correction duration, then in step S422 the selector 210 or the vehicular controller 25 applies location data (e.g., GPS data) only for guidance of the vehicle during a trailing time interval associated with the given time interval or the defined time interval. However, if the location correction duration is greater than a maximum allowable correction duration, then in step S424 the selector 210 or the vehicular controller 25 applies no guidance data from the vision module 22 or the location module 26. For example, the vehicle may revert to a manned mode, an alternate guidance system may be activated or used, or the vehicle may be stopped until a following time interval in which the vision module 22, the location module 26, or both provide more reliable output for guidance of the vehicle.

If step S404 is executed, the method may continue with step S406 after step S404. In step S406, the selector 210 determines if the vision quality level of the vision quality data is greater than (or equal to) a vision quality threshold. The vision quality threshold may be expressed as a reliability level or confidence level, which may be represented as a percentage of otherwise (e.g., 80% reliability or confidence level). If the vision quality level is greater than (or equal to) the vision quality threshold, the method continues with step S416. However, if the vision quality level is less than the vision quality threshold, the method continues with step S424 in which guidance is not applied as previously described.

In step S416, the selector 210 determines if the vision offset is less than (or equal to) a maximum allowable vision-derived displacement (e.g., 10 inches). The maximum allowable vision-derived displacement may be set by a user data input, empirical studies, tests, or practical benchmarks based on environmental factors (e.g., crop selection, planting date, and date of guidance of vehicle). If the vision offset is greater than the maximum allowable vision-derived displacement, the method continues with step S424 in which guidance is not applied. However, if the vision offset is less than or equal to a maximum vision-derived allowable offset, the method continues with step S426.

In step S426, the selector 210 or the vehicular controller 25 applies vision data or vision guidance data only to guide the path of the vehicle.

Having described the preferred embodiment, it will become apparent that various modifications can be made without departing from the scope of the invention as defined in the accompanying claims.

The following is claimed:

1. A method for guiding a vehicle, the method comprising:
  establishing a maximum allowable correction duration for correction of a location error in a position of a vehicle;
  establishing a maximum allowable vision-derived displacement for correction of vision error in the position of the vehicle;
  collecting location data for the vehicle based on a location-determining receiver associated with the vehicle;
  collecting vision data for the vehicle based on a vision module associated with the vehicle;
  estimating location quality data for the location data during an evaluation time window;
  estimating vision quality data for the vision data during the evaluation time window, the vision quality data being degraded by a quality degradation indicator where a reference feature or reference marker in an image is not referenced for a threshold maximum time; and
  selecting a guidance mode of the vehicle based on the quality data and consistent with at least one of the maximum allowable correction duration and the maximum allowable vision displacement.

2. The method according to claim 1 wherein the guidance mode comprises one of a first guidance mode in which the location data is solely or predominately used for guidance of the vehicle for a time interval and a second guidance mode in which the vision data is solely used for guidance of the vehicle for a time interval.

3. The method according to claim 2 wherein a third guidance mode is selected as the guidance mode if the location data quality exceeds a location quality threshold, and if the vision quality exceeds a vision quality threshold, the third guidance mode being a fusion guidance mode.

4. The method according to claim 2 wherein s third guidance mode or fusion guidance mode is selected if the location data quality exceeds a location quality threshold, if the vision quality exceeds a vision quality threshold, if the vision offset is less than maximum allowable vision-derived displacement, and if the location correction duration is less than or equal to the maximum allowable correction duration.

5. The method according to claim 2 wherein the first guidance mode is selected if the location data quality exceeds a threshold quality, if the vision quality does not exceed a threshold quality, and if the location correction duration is less than a maximum allowable correction duration.

6. The method according to claim 2 wherein the second guidance mode is selected if the location data quality exceeds a location quality threshold, if the vision quality exceeds a vision quality threshold, if the vision offset is less than maximum allowable vision-derived displacement, and if the location correction duration is greater than a maximum allowable correction duration.

7. The method according to claim 2 wherein the second guidance mode is selected if the location data quality does not exceed a location quality threshold, if the vision quality exceeds a vision quality threshold, and if the vision offset is less than maximum allowable displacement.

8. The method according to claim 1 wherein the guidance mode comprises one of a first guidance mode in which the location data is sorely or predominately used for guidance of the vehicle for a time interval, a second guidance mode in which the vision data is solely used for guidance of the vehicle for a time interval, a third guidance mode in which the vision data and location data are used for guidance of the vehicle, and a fourth guidance mode in which vision data and location data are not used for guidance of the vehicle.

9. The method according to claim 8 wherein the fourth guidance mode is selected if the location data quality does not exceed a location quality threshold, and if the vision quality does not exceed a threshold quality level.

10. The method according to claim 8 wherein the fourth guidance mode is selected if the location data quality does not exceed a location quality threshold, and if the vision quality exceeds a vision quality threshold and if the vision offset is greater than a maximum allowable vision-derived displacement.

11. The method according to claim 1 wherein the maximum allowable correction duration prevents over-reliance on certain location data not updated by a vision-derived correction in a sufficiently recent manner.

12. A system for guiding a vehicle, the system comprising:
 a data storage device for storing at least one of a maximum allowable correction duration and a maximum allowable vision-derived displacement for correction of a position of a vehicle;
 a location module for collecting location data for the vehicle based on a location-determining receiver associated with the vehicle;
 a vision module for collecting vision data for the vehicle based on a vision module associated with the vehicle;
 a location quality estimator for estimating location quality data for the location data during an evaluation time window;
 a vision quality estimator for estimating vision quality data for the vision data during the evaluation time window, the vision quality data being degraded by a quality degradation indicator where a reference feature or reference marker in an image is not referenced for a threshold maximum time; and
 a selector for selecting a guidance mode of the vehicle based on the quality data and consistent with at least one of the maximum allowable correction duration and the maximum allowable vision-derived displacement.

13. The system according to claim 12 wherein the guidance mode comprises one of a first guidance mode in which the location data is solely or predominately used for guidance of the vehicle for a time interval and a second guidance mode in which the vision data is solely used for guidance of the vehicle for a time interval.

14. The system according to claim 13 wherein the selector selects a third guidance mode as the guidance mode if the location data quality exceeds a location quality threshold, and if the vision quality exceeds a vision quality threshold, the third guidance mode being a fusion guidance mode.

15. The system according to claim 13 wherein selector selects a third guidance mode or a fusion guidance mode if the location data quality exceeds a location quality threshold, if the vision quality exceeds a vision quality threshold, if the vision offset is less than maximum allowable vision-derived displacement, and if the location correction duration is less than or equal to a maximum allowable correction duration.

16. The system according to claim 13 wherein the selector selects the first guidance module if the location data quality exceeds a location quality threshold, if the vision quality does not exceed a vision quality threshold, and if the location correction duration is less than a maximum allowable correction duration.

17. The system according to claim 13 wherein the selector selects the second guidance mode if the location data quality exceeds a location quality threshold, if the vision quality exceeds a vision quality threshold, if the vision offset is less than maximum allowable vision-derived displacement, and if the location correction duration is greater than a maximum allowable correction duration.

18. The system according to claim 13 wherein the selector selects the second guidance mode if the location data quality does not exceed a location quality threshold, if the vision quality exceeds a vision quality threshold, and if the vision offset is less than maximum allowable vision-derived displacement.

19. The system according to claim 12 wherein the guidance mode comprises one of a first guidance mode in which the location data is solely or predominately used for guidance of the vehicle for a time interval, a second guidance mode in which the vision data is solely used for guidance of the vehicle for a time interval, a third guidance mode in which the vision data and location data are used for guidance of the vehicle, and a fourth guidance mode in which the vision data and location data are not used for guidance of the vehicle.

20. The system according to claim 19 wherein the selector selects the fourth guidance mode if the location data quality does not exceed a location quality threshold, and if the vision quality does not exceed a vision quality threshold.

21. The system according to claim 19 wherein selector selects the fourth guidance mode if the location data quality does not exceed a location quality threshold, if the vision quality exceeds a vision quality threshold, and if the vision offset is greater than a maximum allowable vision-derived displacement.

22. The system according to claim 12 wherein the maximum allowable correction duration preventing over-reliance on certain location data not updated by a vision-derived correction in a sufficiently recent manner.

* * * * *